United States Patent
Tropin et al.

(10) Patent No.: US 9,514,221 B2
(45) Date of Patent: Dec. 6, 2016

(54) PART-OF-SPEECH TAGGING FOR RANKING SEARCH RESULTS

(71) Applicant: MICROSOFT TECHNOLOGY LICENSING, LLC, Redmond, WA (US)

(72) Inventors: Kyrylo Tropin, Redmond, WA (US); Ka Cheung Sia, Bellevue, WA (US); Gu Xu, Bellevue, WA (US); Bhuvan Middha, Issaquah, WA (US); Qi Yao, Bellevue, WA (US); Sandeep Dey, Kirkland, WA (US); Junbiao Tang, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 13/828,316

(22) Filed: Mar. 14, 2013

(65) Prior Publication Data

US 2014/0280081 A1    Sep. 18, 2014

(51) Int. Cl.
*G06F 7/00* (2006.01)
*G06F 17/30* (2006.01)

(52) U.S. Cl.
CPC ............... *G06F 17/30684* (2013.01)

(58) Field of Classification Search
CPC ............ G06F 17/3053; G06F 17/30684; G06F 17/2785; G06F 17/2795
USPC .......... 707/723, 735, 748, 749, 722
See application file for complete search history.

(56) References Cited

U.S. PATENT DOCUMENTS

| | | | |
|---|---|---|---|
| 7,269,544 B2 | 9/2007 | Simske | |
| 2007/0078642 A1* | 4/2007 | Weng | G10L 15/1822 704/4 |
| 2008/0071533 A1 | 3/2008 | Cave et al. | |
| 2008/0275694 A1* | 11/2008 | Varone | G06F 17/2785 704/9 |
| 2010/0076957 A1 | 3/2010 | Staddon et al. | |
| 2010/0094845 A1 | 4/2010 | Moon et al. | |
| 2012/0158400 A1 | 6/2012 | Schmidt et al. | |
| 2012/0254143 A1 | 10/2012 | Varma et al. | |

OTHER PUBLICATIONS

Bendersky, et al., "Joint Annotation of Search Queries", In Proceedings of the 49th Annual Meeting of the Association for Computational Linguistics: Human Language Technologies, Jun. 19, 2011, 10 pages.

(Continued)

*Primary Examiner* — Md. I Uddin
(74) *Attorney, Agent, or Firm* — Jessica Meyers; Tom Wong; Micky Minhas

(57) ABSTRACT

Systems, methods, and computer-readable storage media are provided for utilizing part-of-speech (POS) tagging of both the words included in a search query and the words included in potential search result documents to improve query alteration accuracy and search result ranking. Upon receiving a search query, POS tags are assigned to the words comprising the query to create query word-tag pairs. The query word-tag pairs are utilized to reformulate the query and are compared with document word-tag pairs included in a plurality of potential search result documents to determine a degree of similarity. The degree of similarity is utilized as an input in scoring and/or ranking the relevance of the potential search result documents with respect to one another.

17 Claims, 3 Drawing Sheets

(56) References Cited

OTHER PUBLICATIONS

Chowdhury, et al., "Improving Information Retrieval Systems using Part of Speech Tagging", Retrieved on: Nov. 7, 2012, Available at: http://citeseerx.ist.psu.edu/viewdoc/download?doi=10.1.1.39.5178&rep=rep1&type=pdf.

Ganchev, et al., "Using Search-Logs to Improve Query Tagging", In Proceedings of the 50th Annual Meeting of the Association for Computational Linguistics, Jul. 8, 2012, 5 pages.

Barr, et al., "The Linguistic Structure of EnglishWeb-Search Queries", In Conference on Empirical Methods in Natural Language Processing, Oct. 2008, 10 pages.

* cited by examiner

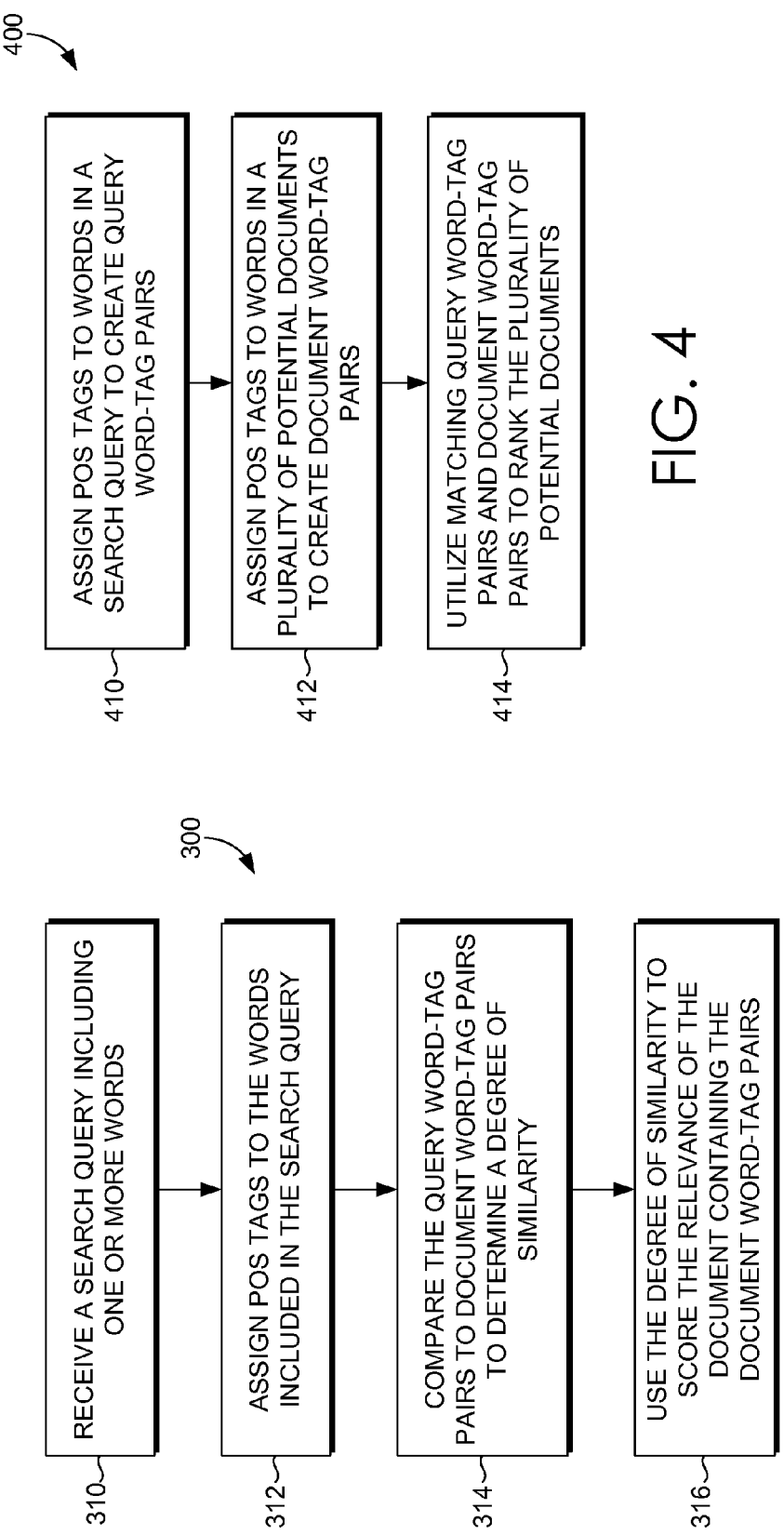

PART-OF-SPEECH TAGGING FOR RANKING SEARCH RESULTS

BACKGROUND

Tremendous effort has been applied in recent years to increase the accuracy of part-of-speech (POS) tagging. While POS tagging has been extensively applied in text-to-speech and machine translation technologies, not much has been done on utilizing it to improve information retrieval. Information retrieval systems regard a match between words in a query and words in a potential search result document as a positive signal indicative of the document's relevance. Word senses or usages, however, are generally ignored often leading to poor search results. For instance, if a user inputs the query "how rich are GOP candidates" or the query "what do we mean by hypothesis," where "rich" appears as an adjective and "mean" appears as a verb, respectively, search result documents having "rich" or "mean" utilized as nouns appear as relevant when, in fact, it is likely they are not.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for utilizing part-of-speech tagging of both the words included in a search query and the words included in potential search result documents to improve query alteration accuracy and search result ranking. Upon receiving a search query, part-of-speech tags are assigned to the words comprising the query to create query word-tag pairs. The query word-tag pairs are utilized to reformulate the query and are compared with document word-tag pairs included in a plurality of potential search result documents to determine a degree of similarity. In this way, a potential search result document having a particular word match with an input query but a different part-of-speech tag associated with the particular word would have a lesser degree of similarity than a potential search result document having a matching query word-tag pair and document word-tag pair. The degree of similarity is utilized to score and/or rank the relevance of the potential search result documents with respect to one another. Thus, assuming all other inputs to the search result document ranking algorithm are equal, a potential search result document having a matching query word-tag pair and document word-tag pair would receive a higher ranking than a document having a particular word match with the input query but having a different part-of-speech tag associated with the particular word.

BRIEF DESCRIPTION OF THE DRAWINGS

The present invention is illustrated by way of example and not limitation in the accompanying figures in which like reference numerals indicate similar elements and in which:

FIG. 3 is a flow diagram showing an exemplary method for utilizing part-of-speech tagging in ranking potential search result documents, in accordance with an embodiment of the present invention;

FIG. 4 is a flow diagram showing another exemplary method for utilizing part-of-speech tagging in ranking potential search result documents, in accordance with an embodiment of the present invention.

DETAILED DESCRIPTION

Figure 1:
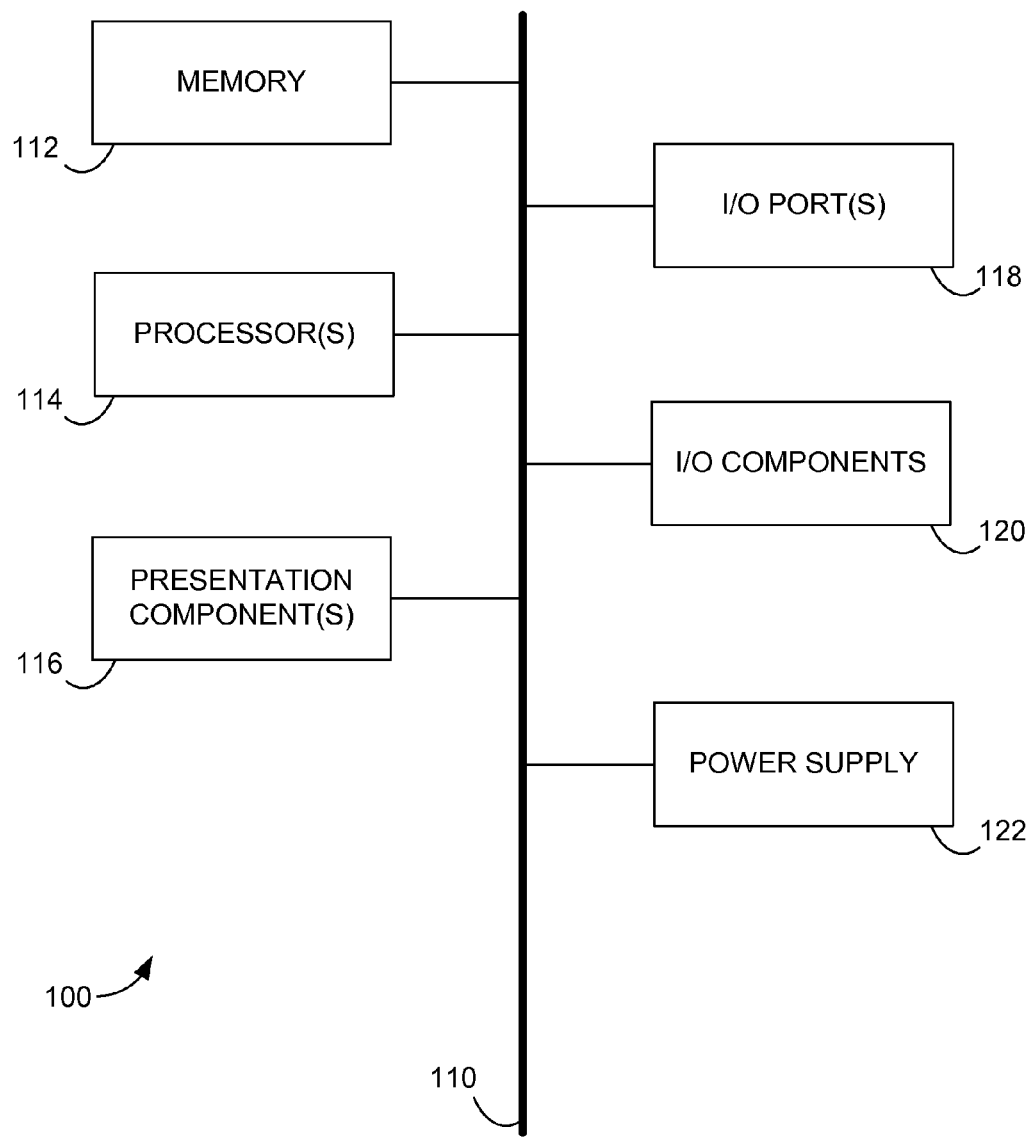
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for utilizing part-of-speech (POS) tagging of both the words included in a search query and the words included in potential search result documents to improve query alteration accuracy and search result ranking. Upon receiving a search query, POS tags are assigned to the words comprising the query to create query word-tag pairs. The query word-tag pairs are utilized to reformulate the query and are compared with document word-tag pairs included in a plurality of potential search result documents to determine a degree of similarity. The degree of similarity is utilized as an input in scoring and/or ranking the relevance of the potential search result documents with respect to one another.

Accordingly, one embodiment of the present invention is directed to one or more computer-readable storage media storing computer-useable instructions that, when used by one or more computing devices, cause the one or more computing devices to perform a method for utilizing POS tagging in ranking potential search result documents. The method includes receiving a search query including one or more words; assigning POS tags to at least a portion of the one or more words included in the search query to create one or more query word-tag pairs; comparing the one or more query word-tag pairs to one or more document word-tag pairs included in at least one potential search result document to determine a degree of similarity; and using the degree of similarity to score the relevance of the at least one potential search result document In another embodiment, the present invention is directed to a method being performed by one or more computing devices including at least one processor, the method for utilizing POS tagging in ranking potential search result documents. The method includes assigning POS tags to words in a search query to create query word-tag pairs; assigning POS tags to words in a plurality of potential search result documents to create document word-tag pairs; and utilizing matching query word-tag pairs and document word-tag pairs to rank the plurality of potential search result documents relative to one another.

In yet another embodiment, the present invention is directed to a system including an information retrieval engine having one or more processors and one or more computer-readable storage media, and a data store coupled with the information retrieval engine. The information retrieval engine is configured to receive a query including one or more words; assigns POS tags to at least a portion of the one or more words included in the query; reformulate the query using the assigned POS tags; and utilizing the reformulated query, determine potential documents for retrieval, in part, by matching the assigned part-of-speech tags with part-of-speech tags included in the potential documents.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted as search requests, part-of-speech tags, words appearing in documents available for retrieval in response to input search requests, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Furthermore, although the terms "search engine" and "information retrieval engine" are used herein, it will be recognized that these terms may also encompass servers, Web browsers, sets of one or more processes distributed on one or more computers, one or more stand-alone storage devices, sets of one or more other computing or storage devices, any combination of one or more of the above, and the like.

As previously mentioned, embodiments of the present invention are generally directed to systems, methods, and computer-readable storage media for utilizing POS tagging of both the words included in a search query and the words included in potential search result documents to improve query alteration accuracy and search result ranking. Upon receiving a search query, POS tags are assigned to the words comprising the query to create query word-tag pairs. The query word-tag pairs are utilized to reformulate the query and are compared with document word-tag pairs included in a plurality of potential search result documents to determine a degree of similarity. In this way, a potential search result document having a particular word match with an input query but a different POS tag associated with the particular word would have a lesser degree of similarity than a potential search result document having a matching query word-tag pair and document word-tag pair. The degree of similarity is utilized to score and/or rank the relevance of the potential search result documents with respect to one another. Thus, assuming all other inputs to the search result document ranking algorithm are equal, a potential search result document having a matching query word-tag pair and document word-tag pair would receive a higher ranking than a document having a particular word match with the input query but having a different POS tag associated with the particular word.

Figure 2:
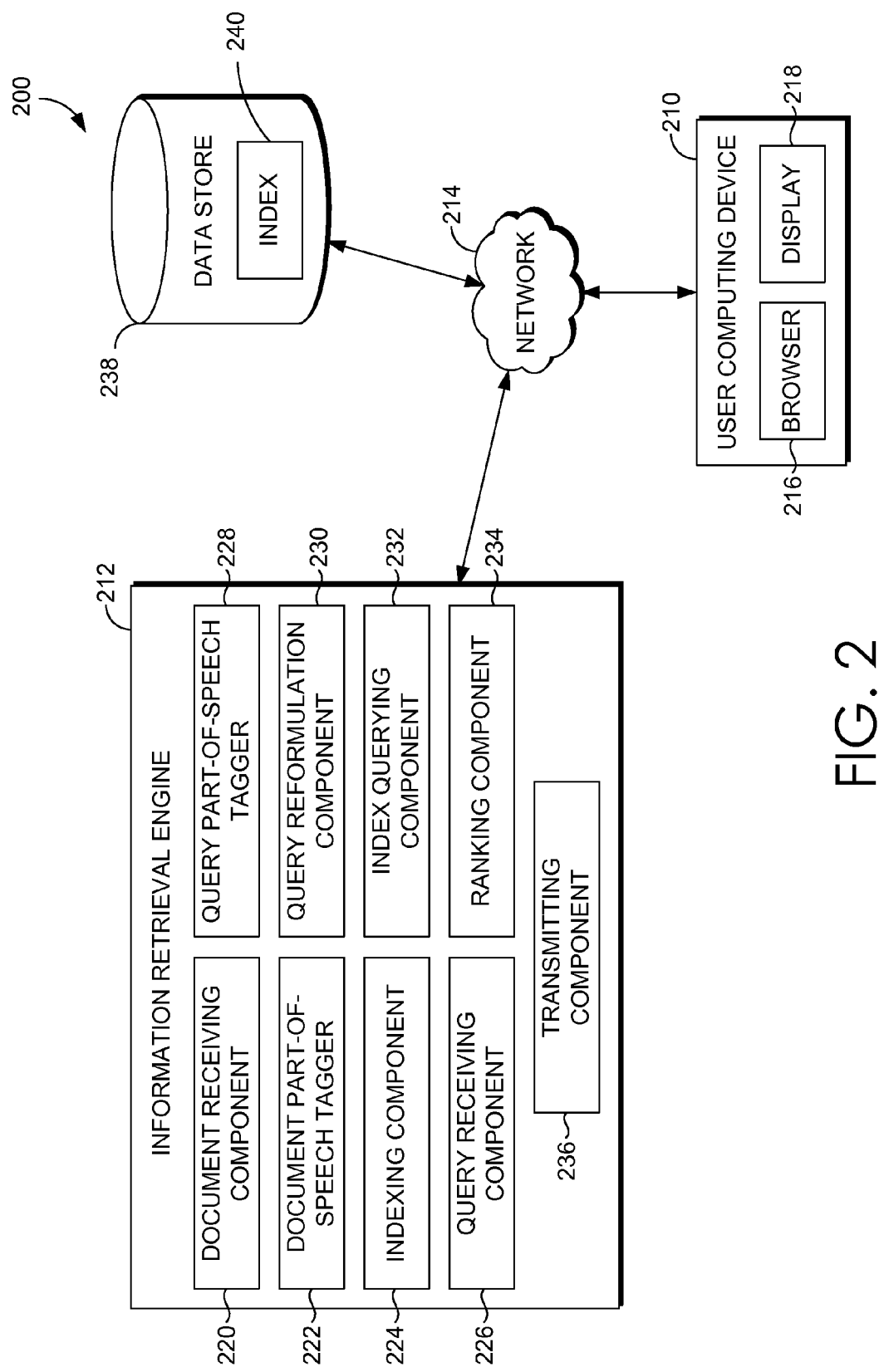
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which POS tagging of both the words included in a search query and the words included in potential documents for retrieval in response to a received search query is utilized to improve query alteration and document relevance ranking. Among other components not shown, the computing system 200 generally includes a user computing device 210 and an information retrieval engine 212 (e.g., a search engine) in communication with one another via a network 214. The network 214 may include, without limitation, one or more local area networks (LANs) and/or wide area networks (WANs). Such networking environments are commonplace in offices, enterprise-wide computer networks, intranets and the Internet. Accordingly, the network 214 is not further described herein.

It should be understood that any number of user computing devices 210 and/or information retrieval engines 212 may be employed in the computing system 200 within the scope of embodiments of the present invention. Each may comprise a single device/interface or multiple devices/interfaces cooperating in a distributed environment. For instance, the information retrieval engine 212 may comprise multiple devices and/or modules arranged in a distributed environment that collectively provide the functionality of the information retrieval engine 212 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the user computing device 210, the information retrieval engine 212, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of information retrieval engines and/or user computing devices. By way of example only, the information retrieval engine 212 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 210 may include any type of computing device, such as the computing device 100 described with reference to FIG. 1, for example. Generally, the user computing device 210 includes a browser 216 and a display 218. The browser 216, among other things, is configured to render search engine home pages (or other online landing pages) and search engine results pages (SERPs), in association with the display 218 of the user computing device 210. The browser 216 is further configured to receive user input of requests for various web pages (including search engine home pages), receive user input search queries (generally input via a user interface presented on the display 218 and permitting alpha-numeric and/or textual input into a designated search input region) and to receive content for presentation on the display 218, for instance, from the information retrieval engine 212. It should be noted that the functionality described herein as being performed by the browser 216 may be performed by any other application, application software, user interface, or the like capable of rendering Web content. It further should be noted that embodiments of the present invention are equally applicable to mobile computing devices and devices accepting touch and/or voice input. Any and all such variations, and any combination thereof, are contemplated to be within the scope of embodiments of the present invention.

The information retrieval engine 212 of FIG. 2 is configured to, among other things, receive queries (e.g., search queries) and provide results (e.g., search result documents) in response thereto utilizing part-of-speech tags. The information retrieval engine 212 is additionally configured to, among other things, assign part-of-speech tags to received queries and potential documents for retrieval in response to received queries, as more fully described below. As illustrated, the information retrieval engine 212 includes a document receiving component 220, a document part-of-speech tagger 222, an indexing component 224, a query receiving component 226, a query part-of-speech tagger 228, a query reformulation or alteration component 230, an index querying component 232, a ranking component 234, and a transmitting component 236. The illustrated information retrieval engine 212 also has access to a data store 238. The data store 238 is configured to store information related to queries, potential documents for retrieval in response to queries, and information pertaining to grammatical and syntactical parts of speech. The data store 238 further includes an index 240. The index 240 is configured to store pre-computed POS information as it relates to potential documents for retrieval in response to queries, as more fully described below. In embodiments, the data store 238 and/or the index 240 are configured to be searchable for one or more of the items stored in association therewith. It will be understood and appreciated by those of ordinary skill in the art that the information stored in association with the data store 238 and/or the index 240 may be configurable and may include any information relevant to words having associated part-of-speech tags. The content and volume of such information are not intended to limit the scope of embodiments of the present invention in any way. Further, though illustrated as a single, independent component, the data store 238 and/or the index 240 may, in fact, be a plurality of storage and indexing devices, for instance a database cluster, portions of which may reside in association with the search engine 212, the user computing device 210, another external computing device (not shown), and/or any combination thereof.

The document receiving component 220 of the information retrieval engine 212 is configured to receive documents for potential retrieval in response to received search queries. Such documents may include, without limitation, a corpus of documents (e.g., a library of documents) having an associated information retrieval tool. By way of another example, such documents may more broadly include documents accessible via the Internet utilizing a generalized information retrieval engine or search engine. It will be understood by those of ordinary skill in the art that the nature and number of documents received utilizing the document receiving component 220 of the information retrieval engine 212 is not intended to limit the scope of embodiments of the present invention in any way.

The document part-of-speech tagger 222 is configured to mark or tag at least a portion of the words included in documents received via the document receiving component 220 with part-of-speech tags. Part of speech tagging is a process by which words in a document are marked as corresponding to a particular part of speech, based on both its definition, as well as its context, i.e., its relationship with adjacent and related words in a phrase, sentence, or paragraph. Part-of-speech tags may thus include, by way of example only and not limitation, the identification of words as nouns, verbs, adjectives, adverbs, determiners, articles, prepositions, pronouns, conjunctions, interjections, and the like. In embodiments, many more categories and sub-categories may be utilized. For instance, for nouns, plural, possessive, and singular forms may be distinguished, as desired. In many languages words may also be marked for their "case" (role as subject, object, etc.), grammatical gender, and so on; while verbs may be marked for tense, aspect, and other things. Any and all such variations, and any combination thereof, are contemplated to be within the scope of embodiments of the present invention. Upon the document part-of-speech tagger 222 tagging a particular word in a document received by the document receiving component 220, a document word-tag pair is created.

The indexing component 224 is configured to store document word-tag pairs created by the document part-of-speech tagger 222 in association with an identifier of the source document in an index, for instance, the index 240. Such document word-tag pairs then may be searched and compared with query word-tag pairs to determine degrees of similarity, as more fully described below.

The query receiving component 226 of the information retrieval engine 212 is configured to receive queries (e.g., search queries) input by users, for instance, utilizing the browser 216 of the user computing device 210. Queries typically include one or more terms, each term including a single word or multiple words comprising a phrase. Upon receiving a query, the query part-of-speech tagger 228 is configured to mark or tag at least a portion of the words included in the query with part-of-speech tags. As previously described, part-of-speech tags may include, without limitation, the identification of query words as nouns, verbs, adjectives, adverbs, determiners, articles, prepositions, pronouns, conjunctions, interjections, and the like. In embodiments, many more categories and sub-categories may be utilized. For instance, for nouns, plural, possessive, and singular forms may be distinguished, as desired. In many languages words may also be marked for their "case" (role as subject, object, etc.), grammatical gender, and so on; while verbs may be marked for tense, aspect, and other things. Any and all such variations, and any combination thereof, are contemplated to be within the scope of embodiments of the present invention. Upon the query part-of-speech tagger 228 tagging a particular word in a query received by the query receiving component 226, a query word-tag pair is created.

The query reformulation or alteration component 230 is configured to reformulate queries received by the query receiving component 226 utilizing any part-of-speech tags assigned to words included in such queries by the query part-of-speech tagger 228. The reformulated queries may then be utilized by the index querying component 232 to query an index (e.g., index 240) that includes document word-tag pairs identified in documents available for retrieval in response to the received query and determine degrees of similarity there between.

By way of illustration, suppose a query is received by the query receiving component 226 that reads: "what do we mean by hypothesis." The query part-of-speech tagger 228 tags the words of the query as follows: the first query word ("what") as a determiner, the second query word ("do") as a verb, the third query word ("we") as a proper noun, the fourth query word ("mean") as a verb, the fifth query word ("by") as a preposition and the sixth query word ("hypothesis") as a noun. The query reformulation component 230 reformulates the received query utilizing the part-of-speech tags such that the reformulated query reads: "what/determiner do/verb we/proper noun mean/verb by/preposition hypothesis/noun." The reformulated query may then be utilized to query the index (e.g., utilizing the index querying component 232) for comparing to and determining degrees of similarity between the query and potential documents available for retrieval, and utilized by the ranking component 234 (more fully described below) to refine its algorithms.

The ranking component 234 is configured to utilize degrees of similarity between the words in a received search query and the words in potential documents for retrieval in response to the received search query as an input in scoring or ranking each respective document based on relevance. In this way, a potential document for retrieval having a particular word match with an input query but a different part-of-speech tag associated with the particular word would have a lesser degree of similarity than a potential document for retrieval having a matching query word-tag pair and document word-tag pair. Thus, the degree of similarity is utilized to score and/or rank the relevance of the potential documents for retrieval with respect to one another. Thus, assuming all other inputs to the document ranking algorithm are equal, a potential document having a matching query word-tag pair and document word-tag pair would receive a higher score or ranking than a document having a particular word match with the input query but having a different part-of-speech tag associated with the particular word.

Thus, referring back to the illustrative example above, suppose a document includes the title "Hypothesis Testing of Mean Variance." These particular words of the document have been tagged as follows (by the document part-of-speech tagger 222): Hypothesis/noun Testing/noun of/preposition Mean/noun Variance/noun. In this instance, the word "mean" would lessen the degree of similarity between the query and the potential document as the senses of the word "mean" between them is mismatched. Thus, only the word "hypothesis" would be counted toward the degree of similarity (and thus be utilized to improve relevance ranking) between the document and the query as it is the only common word sharing the same part-of-speech tag.

The transmitting component 236 of the information retrieval engine 212 is configured to transmit for presentation (for instance, in association with the display 218 of the user computing device 210) at least one document (e.g., search result) in response to a received search query. The at least one document is ranked or scored for presentation based, at least in part, on a degree of similarity between the received search query and the at least one document determined based upon part-of-speech tagging.

Turning now to FIG. 3, a flow diagram is illustrated showing an exemplary method 300 for utilizing POS tagging in ranking potential search result documents, in accordance with an embodiment of the present invention. As illustrated at block 310, a search query is received (e.g., utilizing the query receiving component 226 of the information retrieval engine 212 of FIG. 2), the search query including one or more words. As illustrated at block 312, POS tags are assigned to at least a portion of the one or more words included in the search query (e.g., utilizing the query POS tagger 228 of the information retrieval engine 212 of FIG. 2) to create one or more query word-tag pairs. The one or more query word-tag pairs are compared to one or more document word-tag pairs included in at least one potential search result document to determine a degree of similarity (e.g., utilizing the index querying component 232 and/or the ranking component 234 of the information retrieval engine 212 of FIG. 2), as indicated at block 314. The degree of similarity so determined is utilized to score the relevance of the at least one potential search result document, for instance, relative to other potential search results documents, as indicated at block 316. This may be done, for instance, utilizing the ranking component 234 of the information retrieval engine 212 of FIG. 2.

With reference now to FIG. 4, a flow diagram is illustrated showing another exemplary method 400 for utilizing part-of-speech tagging in ranking potential search result documents, in accordance with an embodiment of the present invention. As indicated at block 410, POS tags are assigned to words in a search query to create query word-tag pairs (for instance, utilizing the query POS tagger 228 of the information retrieval engine 212 of FIG. 2). As indicated at block 412, POS tags are assigned to words in a plurality of potential search result documents (e.g., utilizing the document POS tagger 222 of FIG. 2) to create document word-tag pairs. Matching query word-tag pairs and document word-tag pairs are utilized to rank the plurality of potential search result documents relative to one another, as indicated at block 414. This may be done, for instance, utilizing the ranking component 234 of the information retrieval engine 212 of FIG. 2.

As can be understood, embodiments of the present invention provide systems, methods, and computer-readable storage media for, among other things, utilizing POS tagging of both the words included in a search query and the words included in potential search result documents to improve query alteration accuracy and search result ranking. Upon receiving a search query, POS tags are assigned to the words comprising the query to create query word-tag pairs. The query word-tag pairs are utilized to reformulate the query and are compared with document word-tag pairs included in a plurality of potential search result documents to determine a degree of similarity. In this way, a potential search result document having a particular word match with an input query but a different POS tag associated with the particular word would have a lesser degree of similarity than a potential search result document having a matching query word-tag pair and document word-tag pair. The degree of similarity is utilized to score and/or rank the relevance of the potential search result documents with respect to one another. Thus, assuming all other inputs to the search result document ranking algorithm are equal, a potential search result document having a matching query word-tag pair and document word-tag pair would receive a higher ranking than a document having a particular word match with the input query but having a different POS tag associated with the particular word.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 300 of FIGS. 3 and 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage media storing computer-useable instructions that, when used by one or more computing devices, cause the one or more computing devices to perform a method for utilizing part-of-speech tagging in ranking potential search result documents, the method comprising:

receiving a search query including one or more words;

reformulating the received query by assigning part-of-speech tags to at least a portion of the one or more words included in the search query to create one or more query word-tag pairs;

identifying document word-tag-pairs in a document word-tag-pairs searchable index using the reformulate query to compare the one or more query word-tag pairs to the one or more document word-tag pairs included in a plurality of potential search result documents to determine a degree of similarity; and using the degree of similarity to score the relevance of each of the plurality of potential search result documents to rank the plurality of potential search result documents based on the comparison of the query word-tag pairs from the search query and the document word-tag pairs from the plurality of potential search result documents;

wherein upon the part-of-speech tags assigned to the one or more words identifying at least one of the one or more words as a noun, the respective part-of-speech tag further identifies the noun as plural, possessive, or singular; and wherein upon the part-of-speech tags assigned to the one or more words identifying at least one of the one or more words as a verb, the respective part-of-speech tag further identifies the verb based upon tense or aspect.

2. The one or more computer-readable storage media of claim 1, wherein the part-of-speech tags assigned to the one or more words identifies the one or more words as one of a noun, a verb, an adjective, an adverb, a determiner, an article, a preposition, a pronoun, a conjunction, and an interjection.

3. The one or more computer-readable storage media of claim 1, wherein using the degree of similarity to score the relevance of each of the plurality potential search result documents comprises using the degree of similarity for each potential search result document to rank the potential search result documents of the plurality of potential search result documents.

4. The one or more computer-readable storage media of claim 1, wherein the method further comprises using the part-of-speech tags assigned to the portion of the one or more words included in the search query to reformulate the search query.

5. The one or more computer-readable storage media of claim 1, wherein at least one potential search result document of the plurality of potential search result documents includes one or more words, wherein the method further comprises assigning part-of-speech tags to at least a portion of the one or more words included in the at least one potential search result document to create the one or more document word-tag pairs.

6. The one or more computer-readable storage media of claim 5, wherein the method further comprises indexing the document word-tag pairs in a searchable index.

7. The one or more computer-readable storage media of claim 5, wherein each part-of-speech tag is one of a grammatical part-of-speech tag and a syntactical part-of-speech tag.

8. A method being performed by one or more computing devices including at least one processor, the method for utilizing part-of-speech tagging in ranking potential search result documents, the method comprising:

reformulating a received search query by assigning part-of-speech tags to words in the search query to create query word-tag pairs;

assigning part-of-speech tags to words in a plurality of potential search result documents to create document word-tag pairs searchable index;

identifying the document word-tag-pairs in the searchable index using the reformulate query;

utilizing a degree of similarity score between matching query word-tag pairs and document word-tag pairs to rank the plurality of potential search result documents relative to one another, wherein a first search result document having a matching query word-tag pair and document word-tag pair is ranked higher than a second search result having a word match with the search query where the word match has a different part-of-speech tag in the second search result than in the search query, wherein upon the part-of-speech tags assigned to the one or more words identifying at least one of the one or more words as a noun, the respective part-of- speech tag further identifies the noun as plural, possessive, or singular; and wherein upon the part-of-speech tags assigned to the one or more words identifying at least one of the one or more words as a verb, the respective part-of-speech tag further identifies the verb based upon tense or aspect.

9. The method of claim 8, wherein utilizing matching query word-tag pairs and document word-tag pairs to rank the plurality of potential result documents relative to one another comprises:

comparing the query word-tag pairs with the document word-tag pairs to determine a degree of similarity for each document of the plurality of potential search result documents; and utilizing the respective degrees of similarity as an input to rank the plurality of potential search result documents relative to one another.

10. The method of claim 8, wherein the part-of-speech tags assigned to the words identifies the words as nouns, verbs, adjectives, adverbs, determiners, articles, prepositions, pronouns, conjunctions, and interjections.

11. The method of claim 8, wherein the method further comprises using the part-of-speech tags assigned to the words in the search query to reformulate the search query.

12. The method of claim 8, wherein the method further comprises indexing the document word-tag pairs in a searchable index.

13. A system comprising:

an information retrieval engine having one or more processors and one or more computer-readable storage media;

a data store coupled with the information retrieval engine, wherein the information retrieval engine:

receives a query including one or more words;

assigns part-of-speech tags to at least a portion of the one or more words included in the query to create query word-tag pairs, wherein a first word of the search query is associated with a first query word-tag pair;

reformulates the query using the assigned part-of-speech tags; and utilizing the reformulated query, determines potential documents for retrieval by matching the query word-tag pairs of the search query with document word-tag pairs included in the potential documents and determine a degree of similarity to rank the search query result, wherein the matching includes identifying the first word in a first document and a second document, wherein the first document includes a query word-tag pair and document word-tag pair match for the first word, and wherein the second document has a document word-tag pair for the first word that is different from the query word-tag pair for the first word, wherein upon the part-of-speech tags assigned to the one or more words identifying at least one of the one or more words as a noun, the respective part-of- speech tag further identifies the noun as plural, possessive, or singular; and wherein upon the part-of-speech tags assigned to the one or more words identifying at least one of the one or more words as a verb, the respective part-of-speech tag further identifies the verb based upon tense or aspect.

14. The system of claim 13, wherein the information retrieval engine further determines a degree of similarity between the reformulated query and each potential document for retrieval; and utilizes the respective degrees of similarity to score the relevance of the potential documents.

15. The system of claim 13, wherein the information retrieval engine utilizes the respective degrees of similarity to score the relevance of the potential documents for retrieval by using the respective degrees of similarity to rank the potential documents with respect to one another.

16. The system of claim 13, wherein the part-of-speech tags assigned to the one or more words identifies the one or more words as one of a noun, a verb, an adjective, an adverb, a determiner, an article, a preposition, a pronoun, a conjunction, and an interjection.

17. The system of claim 13, wherein the information retrieval engine further assigns the part-of-speech tags included in the potential documents for retrieval.

* * * * *